United States Patent [19]

Alpert et al.

[11] Patent Number: 5,640,503
[45] Date of Patent: Jun. 17, 1997

[54] METHOD AND APPARATUS FOR VERIFYING A TARGET INSTRUCTION BEFORE EXECUTION OF THE TARGET INSTRUCTION USING A TEST OPERATION INSTRUCTION WHICH IDENTIFIES THE TARGET INSTRUCTION

[75] Inventors: Alan Ian Alpert, Hopewell Junction, N.Y.; Michael Gerard Mall, Morgan Hills, Calif.

[73] Assignee: International Business Machines Corporation, Armonk, N.Y.

[21] Appl. No.: 487,670

[22] Filed: Jun. 7, 1995

Related U.S. Application Data

[63] Continuation of Ser. No. 82,338, Jun. 24, 1993.
[51] Int. Cl.$^6$ .................................................. G06F 11/00
[52] U.S. Cl. .................. 395/568; 395/183.06; 395/800
[58] Field of Search .......................... 395/183.06, 375, 395/800, 180

[56] References Cited

U.S. PATENT DOCUMENTS

| | | | |
|---|---|---|---|
| 3,771,138 | 11/1973 | Celtruda et al. | 395/375 |
| 4,439,828 | 3/1984 | Martin | 395/375 |
| 4,441,153 | 4/1984 | Bullions, III et al. | 395/375 |
| 4,520,440 | 5/1985 | Buonomo et al. | 395/183.01 |
| 4,710,866 | 12/1987 | Zolnowsky et al. | 395/375 |
| 4,853,040 | 8/1989 | Shibuya | 395/375 |
| 4,875,156 | 10/1989 | Tanagawa et al. | 395/375 |
| 5,168,557 | 12/1992 | Shibuya | 395/375 |
| 5,269,017 | 12/1993 | Hayden et al. | 395/182.13 |
| 5,408,674 | 4/1995 | Norrie et al. | 395/800 |
| 5,438,670 | 8/1995 | Baror et al. | 395/483 |

*Primary Examiner*—Kenneth S. Kim
*Attorney, Agent, or Firm*—Lawrence D. Cutter; Peter L. Michaelson; William B. Porter

[57] ABSTRACT

A Test Operation-Code (TSTOP) instruction pre-verifies the validity of a target instruction op-code prior to execution of the target instruction. The pre-verification function, contained within CPU execution unit microcode, sets a return value in a program status word to indicate one of four conditions:

1. The target instruction is present and operable;
2. The target instruction is present in the computer system, but unavailable on this central processor (e.g. an asymmetric feature).
3. The target instruction is not present in this computer system.
4. The TSTOP op-code is recognized, but the target instruction presence cannot be determined.

The return value is testable by the program issuing the TSTOP instruction to determine whether the target instruction should be issued.

19 Claims, 3 Drawing Sheets

OP CODE TABLE 1

| OP CODE | FLAGS | | | ROUTINE |
| --- | --- | --- | --- | --- |
| | TWO BYTE | VALID | ASYMMETRIC | |
| X' 00' | NO | NO | NO | @ROUTINE |
| X' 01' | NO | NO | NO | @ROUTINE |
| X' 02' | NO | YES | NO | @ROUTINE |
| X' 03' | NO | YES | YES | @ROUTINE |
| X' 04' | NO | NO | YES | @ROUTINE |
| ⋮ | ⋮ | ⋮ | ⋮ | ⋮ |
| X' B2' | YES | YES | NO | @OPCODE EXTENSION TABLE |
| ⋮ | ⋮ | ⋮ | ⋮ | ⋮ |
| X' FF' | NO | YES | NO | @ROUTINE |

FIG. 2A

OP CODE EXTENSION TABLE

| OP CODE | FLAGS | | ROUTINE |
| --- | --- | --- | --- |
| | VALID | ASYMMETRIC | |
| X' 00' | NO | NO | @ROUTINE |
| X' 01' | NO | NO | @ROUTINE |
| X' 02' | YES | NO | @ROUTINE |
| X' 03' | YES | YES | @ROUTINE |
| X' 04' | NO | YES | @ROUTINE |
| ⋮ | ⋮ | ⋮ | ⋮ |
| X' FF' | YES | NO | @ROUTINE |

FIG. 2B

METHOD AND APPARATUS FOR VERIFYING A TARGET INSTRUCTION BEFORE EXECUTION OF THE TARGET INSTRUCTION USING A TEST OPERATION INSTRUCTION WHICH IDENTIFIES THE TARGET INSTRUCTION

CROSS REFERENCE TO RELATED APPLICATION

This application is a continuation of our copending patent application Ser. No.08/082,338, filed on Jun. 24, 1993 and entitled "Apparatus and Method for Pre-Verifying an Instruction Operation Code".

FIELD OF INVENTION

This invention relates to the field of computer systems. More particularly it relates to the processing of instructions by a central processor within the computing system.

BACKGROUND OF THE INVENTION

The instruction sets within computer system architectures are often expanded with new instructions. The additional new instructions usually provide some needed functional capability, or an improvement in performance over some prior method. As these new instructions are developed, many times they are added only to the newest model computers that support the architected instruction set and not to previous, existing, models. This can create problems for users of these computers who develop software programs for execution on these computers. These software developers desire to use the very latest instructions in order that their programs provide the most function, or perform the most quickly. Many times these developers need their programs to be able to execute on many (or all) models of the computer hardware. However, if a new instruction is coded in a program, and execution attempted on an older model computer that does not support this instruction, the processor does not recognize the operation code (op-code) of the instruction and causes an error exception to occur. Detecting invalid op-codes is well known in the art, for example, U.S. Pat. No. 4,167,778, INVALID INSTRUCTION CODE DETECTOR, issued Sep. 11, 1979, by Ralph E. Sipple, which describes detecting an invalid (undefined) operation code at instruction decode time and then causing an error exception signal. Computer hardware systems, e. g., the IBM ESA/390 computing system, typically provide a mechanism for an exception handling program to gain control upon the error exception (for example in the IBM ESA/390 architecture this is achieved via a Program Status Word (PSW) for an interrupt category, and the address (in the PSW) of the proper interrupt handler). Many operating systems executing in these processors also provide a recovery mechanism based on the processor's exception handling capability. For example, in IBM's MVS/ESA operating system the capability exists for a program to specify a recovery routine (program) to begin execution if an error exception occurs. The recovery routine (program) can recover from the error, and continue execution, or allow the error exception to terminate execution of the program. This creates a dilemma for the software developer if the new instructions are not available on all models; the program can fail depending on the computer model executing the program. Typically, the dilemma is handled in one of three ways;

1. The program is written to establish a recovery routine (program) to receive control when the program attempts to execute the potentially undefined instruction. Upon receiving control, the recovery routine simulates the undefined instruction's execution and the program continues at the next sequential instruction (NSI) after the program interruption.
2. Separate versions of the program are written. The version that includes the new instruction is specified as the version for the computer models supporting the new instruction. The version that does not include the new instruction is specified for computer models that do not support the new instruction.
3. The program is written without using the new instruction, thus insuring it's execution on all models of the computer, but not gaining the benefits of the new instruction on those models supporting the new instruction.

There are shortcomings with each of these alternatives. Alternative one (1) works on both processors that do not support the new instruction, and processors that do support the new instruction. However, this alternative can result in significant performance degradation when executing on older processors that do not support the new instruction. Simulation of these new instructions, which typically are implemented for performance enhancements, introduce exception handler and recovery program overhead to already performance sensitive areas. This tends to make a bad situation worse when executing on older processors which do not support the new instructions and leads to alternatives two (2) and three (3). Alternative two (2) adds additional cost to developing and maintaining the program, since multiple versions exist. It can also create confusion if an incorrect version is executed and that version abnormally terminates, or fails to provide the enhanced function. Alternative three (3) affords the program no benefit from the new instruction and therefore no benefit to the users of the newer computer model. While alternative one (1) appears to remedy the situation, it does so by incurring the overhead of the computer system's exception handling mechanism and the operating system's recovery processing before determining that simulation is necessary, because it requires that execution of the undefined instruction be attempted. There are examples, in prior art, of interrogating an element of a computer system to determine if the computer system element supports a specific function before attempting execution of that function. For example, the IBM Technical Disclosure Bulletin, dated December 1991, Vol. 34, No. 7A, pp. 122–131, titled "NEW I/O SUBSYSTEM COMMAND: READ COMMAND SET", by R. E. Wagner, which describes a new command to an I/O Subsystem requesting feedback of all commands supported by that I/O Subsystem, so that an attempt to execute a nonexistent function is avoided. This technique of responding with all functions that are supported is not well suited for use in program to CPU communication. Because of the need for very fast interrogation and response, while executing instructions on a processor, a high performance specific query is needed. In the I/O subsystem world it is common for I/O driver software to have the need, at initialization time, for general information about the subsystem to which it is connected. But, during execution of programs, any extra CPU cycles become counterproductive. Additionally, a nonspecific response, such as the one described above in the referenced TDB, would generally be unusable for implementation in most programs as it would add a great amount of logic to each program to maintain lists of instructions that are supported and then to have to search lists looking for an instruction that may not be there. What is needed in the processor environment is a high performance, easy to implement method of determining if an instruction is supported. There are also many examples, in prior art, of "pre-fetching" and interrogating instructions prior to their execution. The IBM Technical Disclosure Bulletin, dated November 1980, pp. 2600-2604, titled "INSTRUCTION SCAN FOR EARLY RESOLUTION OF A BRANCH INSTRUCTION", by J. Y. Yamour, which describes a means of "pre-fetching" and interrogating instructions to search for specific "branch" op-codes, so that the instruction stream to be executed after the branch instruction can be determined. This is done to improve performance of a "cached" CPU. Likewise, U. S. Pat. No. 4,710,866, METHOD AND APPARATUS FOR VALIDATING PREFETCHED INSTRUCTION, issued Dec. 1, 1987, by John Zolnowsky, et al., which describes "pre-fetching" instructions in a pipelined CPU and interrogating the instructions in order to insure that complete instructions have been fetched. In so doing, this patent also identifies undefined instructions at "pre-fetch" time but, unlike the present invention, takes no action to inform the executing program of this fact so that the program could avoid executing them. Instead, it leaves them for execution and processing through an aforementioned interrupt (exception) processor, thus defeating the present invention's objective of avoiding execution overhead.

SUMMARY OF THE INVENTION

An instruction (Test Operation, or TSTOP) tests the presence or absence of a target instruction within the executing processor. The target instruction is not executed by TSTOP, but values are returned (testable by a program) indicating the presence or absence of the target instruction. A program testing the return values may then simulate the target instruction if desired, but in any event can avoid a program exception which would be caused by executing the target instruction. This allows utilization, by a program, of new instructions on supporting processors, while avoiding the overhead of exception and recovery processing on processors not supporting the new instruction.

It is an object of this invention to allow a program, during execution, to determine the validity of an instruction not yet executed.

It is further an object of this invention to avoid entering the computer system's exception processing or recovery processing to determine the validity of an instruction.

It is further an object of this invention to provide a mechanism (through a program instruction) for a program's use in testing for the presence of an instruction within the instruction set of the executing processor without executing that instruction.

It is further an object of this invention to provide a return value, indicating the results of the test, to the program initiating the test.

It is further an object of this invention to provide a return value that indicates the target instruction is available on at least one processor in the computing system, although not available on the executing processor.

It is further an object of this invention to provide a return value that indicates that the validity of the target instruction cannot be determined.

BRIEF DESCRIPTION OF THE DRAWINGS

FIGS. 2A and 2B are diagrams of the tables used (respectively OPCODE TABLE 1 and OPCODE EXTENSION TABLE ) in this invention to achieve the stated results.

DESCRIPTION OF THE PREFERRED EMBODIMENT

The preferred embodiment is depicted in the accompanying figures and the following description. This invention is operable on any computing system capable of executing programmed instructions and returning a testable value from said instructions to the executing program. In describing the invention, examples using IBM's ESA/390 computing system may be used, but the invention is not limited to ESA/390 and remains workable for any computer architecture.

Figure 1:
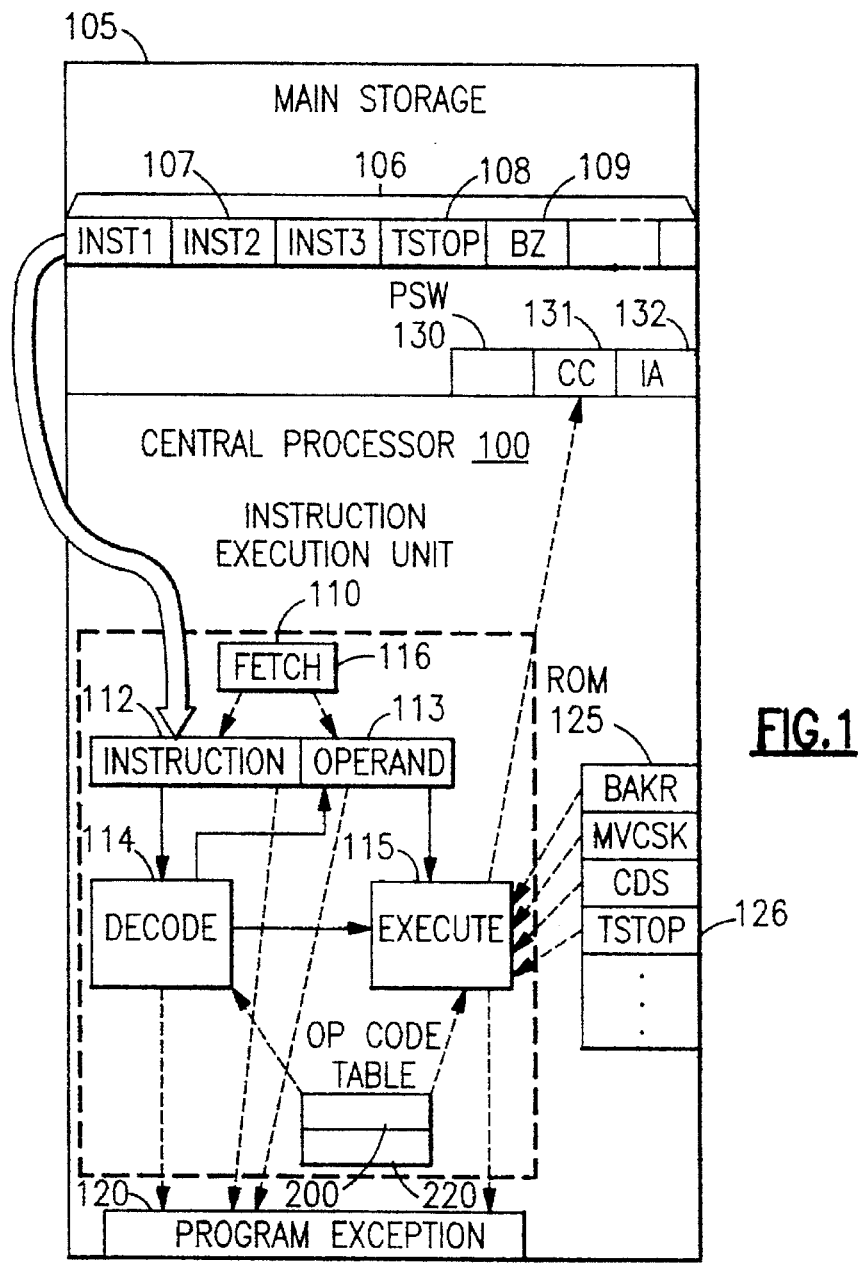
FIG. 1 is a system diagram showing the key elements of the present invention.

FIG. 1 is a diagram of a computing system within which the subject invention can operate. Key elements required in the computing system are a central processor, 100, capable of executing instructions within a program, and main storage, 105, capable of storing programs comprising instructions. The portion of main storage shown, 106, represents a part of such a program and the instructions within the program. In FIG. 1, blocks 107, 108 and 109 represent individual instructions, in the sequence written in the program and available for execution. For simplicity, they are labeled, INST1, INST2, etc. Note that block 108 represents the TSTOP instruction, while block 109 represents a branching instruction (BZ in an ESA/390 implementation) for branching dependent on the return value from TSTOP. In operation, the hexadecimal value for the op-code and operands of the TSTOP instruction would be in main storage, as well as the hexadecimal values for the op-codes and operands of each of the other instructions. The Main Storage, 105, also contains a Program Status Word (PSW), 130, which contains a "condition code" (CC), 131, which is used by the Central Processor, 100, to store return values from instruction execution, and an "instruction address", (IA), 132, which is the address of the next instruction to be executed, used by the Central Processor, 100 for sequencing the instruction stream. The PSW, 130, is an example taken from the ESA/390 computer system. Alternative embodiments are possible where the return value is in other than a CC, 131, for example, the return value could be placed in a storage location specified by an operand of the TSTOP instruction, or within a general purpose register specified by the TSTOP instruction. This invention is operable with any method of returning values from an executing instruction. The attachment of main storage, 105 and the central processor, 100, are via conventional means. It should be noted that this invention may operate in a computing system with "cached" storage, in which the instructions are accessed by the central processor, 100, from the cache and not directly from the main storage, 105. Within the central processor, 100, is an Instruction Execution unit, 110. The Instruction Execution unit conventionally comprises Fetch functions 116 for fetching instructions and operands, 112–113 from the main storage, 105, Decode functions 114 for decoding instructions, and Executing functions 115 for executing instructions. An operation code (op-code) table comprising a base table 200 and an extension table 220 is used in decoding and executing the instructions. Also present in the central processor, 100, is a Program Exception function, 120, which handles exception cases from the Instruction Execution unit, 110. Examples of these exceptions are: undefined op-codes; invalid addresses of operands or data; storage protection errors caused by operands or data. These are examples of the many types of exceptions that could be generated from an Instruction Execution unit, 110. For this invention, the exception caused by an undefined op-code is the only one of interest. Although the preferred embodiment shows this program exception processing as a separate element within the Central Processor, 100, alternative embodiments where the program exception processing is implemented differently are within the scope of this invention. Contained within the Central Processor, 100, is a Read Only Memory (ROM), 125, containing the microcode logic for the instructions supported by the computer system architecture. In this example, mnemonics for some ESA/390 instructions are shown to represent the logic for each of those instructions. Note that the logic for the instruction created by this invention, TSTOP, is shown at block 126, and will be subsequently described in detail. The execution part, 115, of the Instruction Execution unit, 110, uses this ROM, 125, to execute individual instructions. Alternative embodiments are possible where the logic for the instructions is contained in other than microcode in a ROM, for example the instructions could be implemented in circuits within a general purpose register specified by the TSTOP instruction. This invention is operable with any method of returning values from an executing instruction.

The elements described in FIG. 1 work together to achieve the invention described herein. The instructions, 106, residing in main storage, 105, are input to the Instruction Execution unit, 110, of the Central Processor, 100. The Instruction Execution unit, 110, fetches the instructions and operands, 112–113 as required and decodes, 114, and executes, 115, them. When exception conditions are encountered (e.g., an undefined op-code) the program exception processing, 120, takes place. The execution part, 115, of the Instruction Execution unit, 110, uses the microcode logic in the ROM, 125, to execute the program's instructions. Upon execution, return values can be set in the CC part, 131, of the PSW, 130, for testing by a subsequent instruction of the executing program, 106. The computing system shown is typical of existing art computing systems. This invention is workable on any computing system comprising the functions described here.

FIGS. 2A and 2B show the table constructs used by this invention, and are new with this invention. OPCODE TABLE 1, FIG. 2A, 200, has information for all op-codes which are one byte in length (values of hex '00' to hex 'FF'), and has 256 entries. For each op-code that is two bytes in length, there is an entry in OPCODE TABLE 1 for the first byte of the op-code and a pointer to an OPCODE EXTENSION TABLE which contains information on the second byte of the op-code. Therefore in this embodiment there are no one byte op-codes which have the same value as the first byte of a two byte op-code. Alternative embodiments are possible which represent one and two byte op-codes differently and this invention remains workable in these embodiments. FIG. 2B, 220, shows an OPCODE EXTENSION TABLE. For each two byte op-code there is a unique OPCODE EXTENSION TABLE of 256 entries. Each OPCODE TABLE 1, 200, entry has the following fields:

Op Code, 205, —one byte hexadecimal representation of an op-code, hex '00' to hex 'FF'.

Flags, 207, —three flag indicators as follows:
Two byte, 211, —when set to "YES", this op-code is the first byte of a two byte op-code and ROUTINE, 215, is a pointer to the OPCODE EXTENSION TABLE for the second byte of the op-code. When set to "NO", this is a one byte op-code.

Valid, 210, —when set to "YES", this op-code is present and available on this processor, when set to "NO", this op-code is not present on this processor and will cause an exception condition. This bit has no meaning if the Two byte flag, 211, is equal to "YES".

Asymmetric, 212, — when set to "YES", this op-code is asymmetric (not available on all processors of the computing system if a multiprocessor), when set to "NO" this instruction is not asymmetric (availability is the same on all processors in the computing system). This bit has no meaning if the Two byte flag, 211, is equal to "YES".

Routine, 215, —contains the address of the microcode for executing this instruction, if the Two byte flag, 211, is equal to "NO". It is the address of the OPCODE EXTENSION TABLE for the second byte of this op-code if the Two byte flag, 211, is equal to yes.

OPCODE TABLE 1, 200, contains entries for each possible op-code of one byte in length, and a pointer to an OPCODE EXTENSION TABLE for two byte op-codes. Each OPCODE EXTENSION TABLE, 220, entry has the following fields:

Op Code, 225, —one byte hexadecimal representation of the second byte of a two byte op-code, (values of hex '00' to hex 'FF').

Flags, 227, —two flag indicators as follows:
Valid, 230, —when set to "YES", this op-code is present and available on this processor, when set to "NO", this op-code is not present on this processor and will cause an exception condition.

Asymmetric, 235, —when set to "YES", this op-code is asymmetric (not available on all processors of the computing system if a multiprocessor), when set to "NO" this instruction is not asymmetric (availability is the same on all processors in the computing system).

Routine, 240, —contains the address of the microcode for executing this instruction.

An OPCODE EXTENSION TABLE, 220, contains one entry for each possible second byte of an op-code of two bytes in length. In this invention the first byte of a two byte op-code is in OPCODE TABLE 1, and the second byte is in the OPCODE EXTENSION TABLE for that two byte op-code. While the preferred embodiment shows an implementation with op-codes of one or two bytes in length, any length op-code supported by the computer system is workable with this invention.

Figure 3:
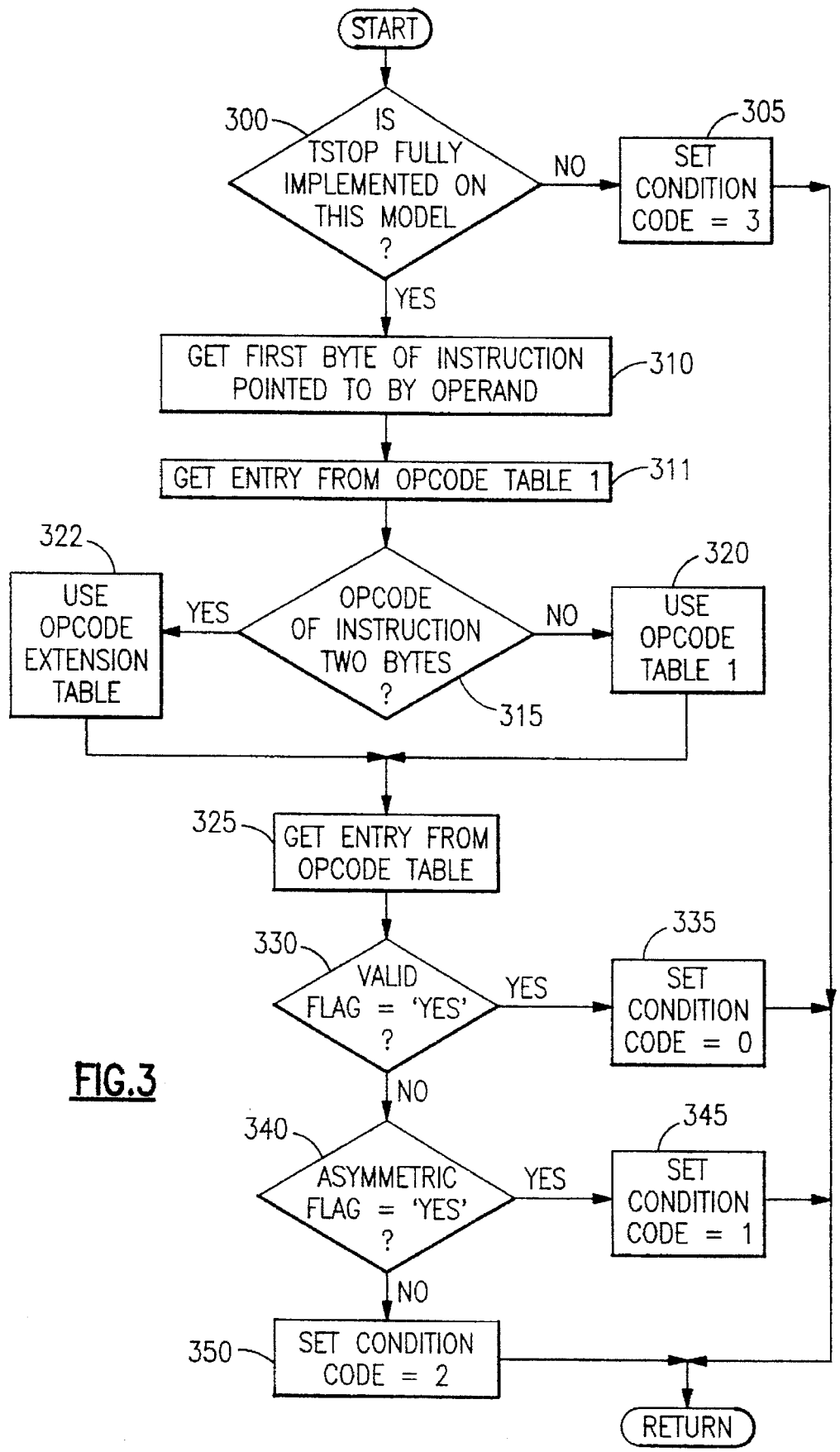
FIG. 3 is a flow diagram of the logic of the TSTOP instruction.

The logic of the TSTOP instruction is shown in FIG. 3. It should be noted that there are five (5) possible outcomes of the execution of the TSTOP instruction. They are:

1. An exception condition if the TSTOP instruction is not present (undefined) on the executing processor (e.g., in an ESA/390 processor an operation type program exception would result). This outcome is not new with this invention and is the result of prior art processing of undefined instructions.
2. Condition code =0 (in an ESA/390 implementation), which indicates the target instruction is present and operable.
3. Condition code =1 (in an ESA/390 implementation), which indicates the target instruction is present in the computer system, but unavailable on this central processor (e.g., an asymmetric feature).
4. Condition code =2 (in an ESA/390 implementation), which indicates that the target instruction is not present in this computer system.
5. Condition code =3 (in an ESA/390 implementation), which indicates that the TSTOP op-code is recognized, but the target instruction's presence and availability cannot be determined.

Upon entry to the TSTOP routine microcode, (FIG. 3 at 300), the TSTOP routine microcode will either partially or fully implement the TSTOP function depending upon machine model or level. If the machine partially implements TSTOP, the condition code, 131, in the PSW, 130, is set to "3" (FIG. 3 at 305), indicating the TSTOP instruction is recognized, but the presence of the target instruction cannot be determined, and TSTOP processing is complete. (Note: this function is especially useful if full implementaiton of TSTOP on an existing machine is not possible. The partial implementation can expedite use of the TSTOP function without the overhead of the computer system's exception processing.) If the machine fully implements TSTOP, it has a corresponding entry in the op-code table 200. The first byte of the target instruction pointed to by the TSTOP operand is retrieved (FIG. 3 at 310). This first byte is used to index into OPCODE TABLE 1, (FIG. 3 at 311) and retrieve that entry. If the Two byte flag, 211, in the retrieved entry indicates "YES", (FIG. 3 at 315), the op-code of the target instruction is two bytes in length. Then the second byte of the instruction is used as an index into the OPCODE EXTENSION TABLE, (FIG. 2B) pointed to by the Routine field, 215, of the OPCODE TABLE 1 entry, (FIG. 2A), (FIG. 3 at 322). Otherwise, OPCODE TABLE 1, FIG. 2A, 200, is used (FIG. 3 at 320), with the first byte of the target instruction as the index into the table. The OPCODE TABLE (FIGS. 2A and 2B) entry for this target op-code is retrieved by using the target instruction op-code index as described above, (FIG. 3 at 325). If the valid flag, 210 or 230, is set to "YES", meaning the target instruction is present on this processor, (FIG. 3 at 330), then the condition code, 131, in the PSW, 130, is set to 0, (FIG. 3 at 335), and processing of TSTOP is complete. If the Valid flag, 210 or 230, is set to "NO" then the Asymmetric flag, 212 or 235, is tested (FIG. 3 at 340). If the Asymmetric flag, 212 or 235, is set to "YES", (FIG. 3 at 340), indicating the target instruction is present on some other processor in the computing system, the condition code, 131, in the PSW, 130, is set to 1, (FIG. 3 at 345), and TSTOP processing is complete. If the Asymmetric flag, 212 or 235, is equal to "NO", indicating the target instruction's presence is the same on all processors in the computing system, the condition code, 131, in the PSW, 130, is set to 2, (FIG. 3 at 350), and TSTOP processing is complete.

The processing performed by the process that issued TSTOP will depend upon the condition code returned, as well as upon the execution environment. In a non-preemptive task dispatching environment (i.e., one in which the system is disabled for interrupts), the instruction determined to be present and operable by TSTOP can be executed immediately upon a determination of instruction validity, knowing that the instruction will be executed on the processor for which validity was just determined. If the condition code indicated instruction is present in the computer system but unavailable on this central processor, the process executing the TSTOP may either simulate the instruction (in a non-preemptive dispatching environment) or—in a preemptive dispatching environment—may elect to save status and redispatch with "affinity" for a processor on which the instruction is present and operable. (Techniques for dispatching with affinity are well known in the art—see, e.g., U.S. Pat. No. 4,809,157 issued Feb. 28, 1989 to Eilert, et al., entitled "Dynamic Assignment of Affinity for Vector Tasks", and assigned to the assignee of the present invention. It is incorporated herein by reference.)

Figure 4:
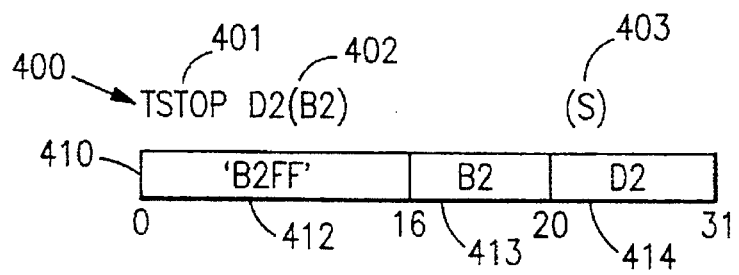
FIG. 4 is an instruction format diagram showing a format for the TSTOP instruction.

FIG. 4 is an example of the TSTOP instruction in an IBM ESA/390 implementation as it might appear in the available IBM publication, Enterprise Systems Architecture/390 Principles of Operation, SA22-7201-00. FIG. 4 at 400, shows the instruction as it would be coded. TSTOP, 408, is the instruction mnemonic, the operand, 402, in displacement(base) format, forms the address of the target instruction to be interrogated. FIG. 4 at 410, shows how the TSTOP instruction format would look in its hexadecimal storage resident form. The instruction is 32 bits in length. The first 16 bits form the op-code, 412, in this example, hex "B2FF". Bits 16–19, 413, form the base register of the operand, while bits 20–31, 414, form the displacement part of the operand. The operand forms the address where the target instruction to be interrogated by TSTOP, resides. Note that while this example uses an ESA/390 form for the TSTOP instruction, any form suitable to the architecture of the executing processor is workable with this invention.

The invention claimed is:

1. An apparatus for pre-verifying a validity of an instruction operation code in a computer, said computer comprising a main storage and a processing unit, said apparatus comprising an instruction execution unit within said processing unit, said instruction execution unit comprising:
   i) means for fetching an instruction to be executed from said main storage to generate a fetched instruction;
   ii) means for decoding said fetched instruction to generate a decoded instruction;
   iii) means for executing said decoded instruction, said means for executing being capable of invoking one of a set of pre-programmed logic routines to perform said decoded instructions, wherein the set of pre-programmed logic routines includes a "test operation" pre-programmed logic routine for testing whether a target instruction is valid when said decoded instruction is a "test operation" instruction, and for setting an exception indication within a return value field to indicate a status of said target instruction and wherein said return value field is stored within said main storage.

2. The apparatus of claim 1 in which said means for executing further comprises means for providing information to said means for decoding and said means for executing for decoding and executing said fetched instruction.

3. The apparatus of claim 2 in which said information comprises operation code validity information, and addressing information for addressing a particular one of said set pre-programmed logic routines.

4. The apparatus of claim 3 in which said operation code table means comprises a primary table section for one byte operation codes, and an extension table section for two byte operation codes.

5. The apparatus of claim 1 in which said computer is a multiprocessing computer further comprising a second processing unit, and in which said status of said target instruction signifies an ability of the second processing unit to execute said target instruction logic means.

6. The apparatus of claim 1 in which said status of said target instruction signifies absence of a pre-programmed logic routine, corresponding to said target instruction on said computer.

7. The apparatus of claim 1 in which said status of said target instruction signifies presence and availability for operation of a pre-programmed logic routine, corresponding to said target instruction on said computer.

8. The apparatus of claim 1 in which said status of said target instruction signifies that presence and availability for operation of pre-programmed logic routine, corresponding to said target instruction can not be determined.

9. The apparatus of claim 1 in which said return value field is contained within a Program Status Word.

10. A method for pre-verifying a validity of an instruction operation code in a computer comprising main storage and a processing unit, said method comprising the steps of:

a. issuing a test operation instruction, said test operation instruction having an operand which designates a target instruction having an operation code to be tested;

b. executing said test operation instruction by testing whether a pre-programmed logic routine, corresponding to said target instruction is provided in the computer; and c. setting an exception indicator in a return value field in response to said testing.

11. The method of claim 10 in which the step of testing comprises sub-steps of:

a. attempting to identify an entry within an operation code table by means of said operation code; and b. determining whether the pre-programmed logic routine, corresponding to the target instruction, is provided in the computer from said entry.

12. The method of claim 11 in which said entry comprises a validity field.

13. The method of claim 12 in which said entry further comprises an asymmetric field.

14. The apparatus of claim 1 in which said computer is a multiprocessing computer comprising a second processing unit, and in which said status of said target instruction signifies the presence of a pre-programmed logic routine, corresponding to the target instruction, on said second processing unit.

15. The apparatus of claim 1 in which said status of said target instruction signifies a condition selected from a group consisting of:

a) absence of a pre-programmed logic routine, corresponding to said target instruction, on said computer;

b) presence and availability for operation of a pre-programmed logic routine, corresponding to said target instruction, on said computer; and c) presence and availability for operation of a pre-programmed logic routine, corresponding to said target instruction, can not be determined.

16. In a computer having (i) a storage unit for storing a sequence of instructions and (ii) a processor, an apparatus for pre-verifying that an instruction operation code is supported by the processor, the apparatus comprising:

i) an instruction fetch unit for fetching an instruction to be executed by the processor from the storage unit to generate a fetched instruction;

ii) a decoder for decoding at least a portion of the fetched instruction to generate a decoded instruction;

iii) a set of pre-programmed logic routines, each of the set of pre-programmed logic routines corresponding to an instruction supported by the processor; and iv) an instruction execution unit for executing the decoded instruction based on at least one of the set of pre-programmed logic routines, wherein the set of pre-programmed logic routines includes a "test operation" pre-programmed logic routine for testing whether a target instruction is supported by the processor when said decoded instruction is a "test operation" instruction.

17. The apparatus of claim 16 wherein when said decoded instruction is the "test operation" instruction, an exception indication within a return value field is set to indicate a status of said target instruction.

18. The apparatus of claim 16 wherein the "test operation" instruction includes an instruction section and an operand section, the operand section containing an address of the target instruction.

19. In a computer having (i) a storage unit for storing a sequence of instructions and (ii) a processor, a method for pre-verifying that an instruction operation code is supported by the processor, the method comprising steps of:

i) fetching an instruction to be executed by the processor from the storage unit to generate a fetched instruction;

ii) decoding at least a portion of the fetched instruction to generate a decoded instruction; and iii) executing the decoded instruction based on at least one of a set of pre-programmed logic routines, each of the set of pre-programmed logic routines corresponding to an instruction supported by the processor, wherein the set of pre-programmed logic routines includes a "test operation" pre-programmed logic routine for testing whether a target instruction is supported by the processor when said decoded instruction is a "test operation" instruction.

* * * * *

UNITED STATES PATENT AND TRADEMARK OFFICE
CERTIFICATE OF CORRECTION

PATENT NO. : 5,640,503

DATED : June 17, 1997

INVENTOR(S) : Alpert et al.

It is certified that error appears in the above-identified patent and that said Letters Patent are hereby corrected as shown below:

Column 8, line 55,            delete "logic means"
claim 5

Signed and Sealed this

Eighteenth Day of November 1997

*Attest:*

BRUCE LEHMAN

*Attesting Officer*        *Commissioner of Patents and Trademarks*